July 24, 1951     A. H. SCHUTTE     2,561,419
PROCESS FOR PRODUCING GAS FROM OIL Filed Dec. 12, 1945     2 Sheets-Sheet 1

INVENTOR.
August Henry Schutte
BY
ATTORNEY

Patented July 24, 1951

2,561,419

UNITED STATES PATENT OFFICE 2,561,419

PROCESS FOR PRODUCING GAS FROM OIL

August Henry Schutte, Hastings on Hudson, N. Y., assignor to The Lummus Company, New York, N. Y., a corporation of Delaware Application December 12, 1945, Serial No. 634,498

3 Claims. (Cl. 48—197)

This invention relates to the continuous production of commercial heating and illuminating gas generally known as "city" gas.

The principal object of my invention is to provide a continuous method for producing a commercial or city gas having a relatively high heating value in simplified apparatus operated at relatively low temperatures.

More specifically, I provide a continuous and cheap method and apparatus under positive but flexible control for converting heavy residual oils into high heating value oil gas and producer gas which are mixed to provide desired heating values.

A more specific object of my invention is to continuously move a bed of solids containing carbon through independent reaction chambers maintained under predetermined conditions of temperature and with the desired amount of air and steam, whereby desirable heating gases may be produced.

A still further object of the invention is to provide, as an alternative method, the production of heating gas as a by-product of an oil refinery coking operation where the major product is coker gas oil for further processing.

Further objects and advantages of my invention will appear from the following description of preferred forms of embodiment of my invention taken in connection with the attached drawings illustrative thereof and in which.

Figure 1:
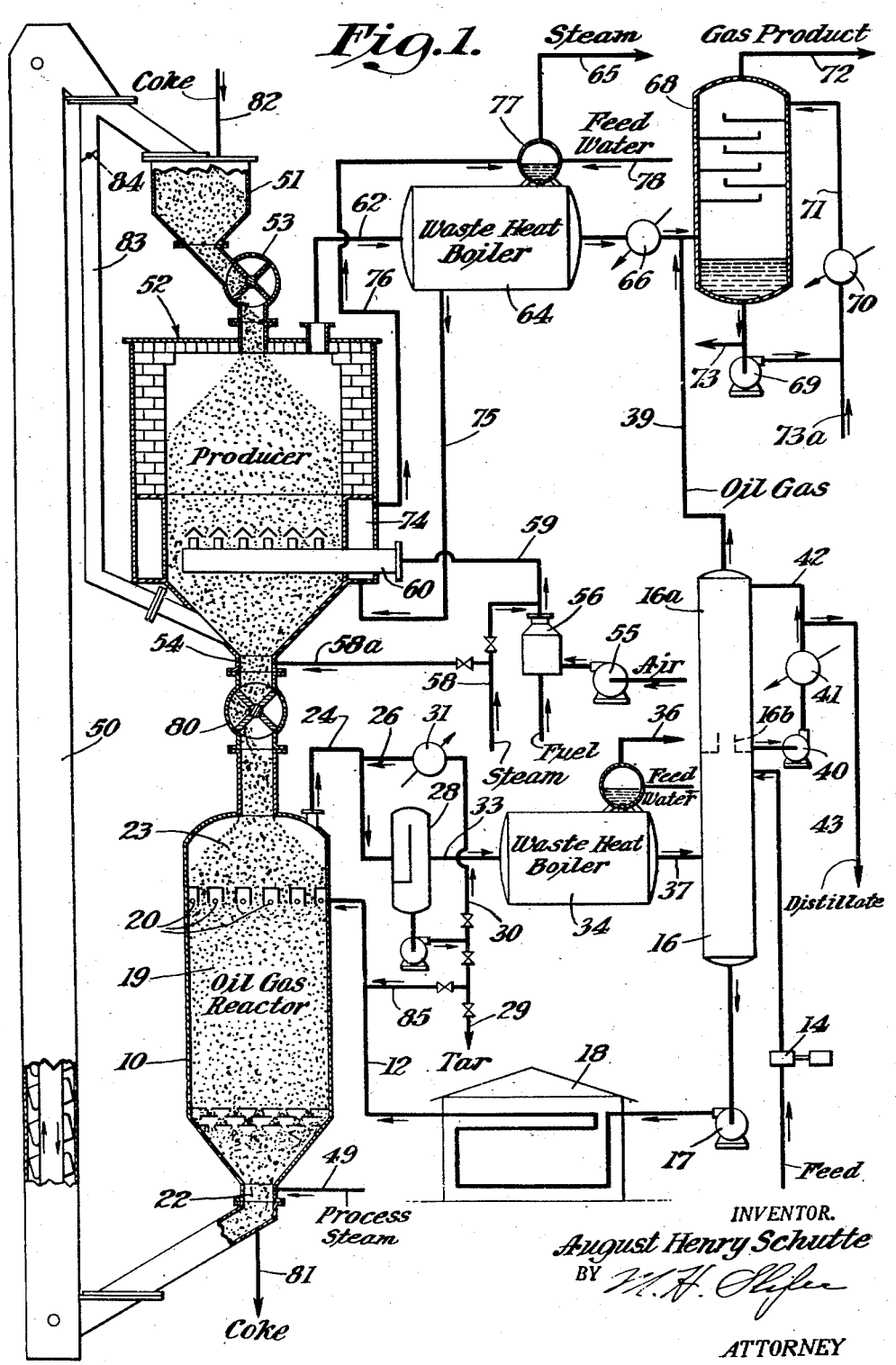
Fig. 1 is a diagrammatic view of apparatus adapted to produce gas of commercial quality as a primary product.

In accordance with my invention, I provide an oil-gas reactor 10 of the type, for example, as shown in my Patent 2,482,137, of September 20, 1949, to which preheated residual oil may be introduced through the line 12, such oil having been initially introduced through the charge oil pump 14 into the tower 16 from which the heavy residual oil is withdrawn by pump 17, and passed through the heater 18 to raise the oil to the desired temperature which in one preferred operation is 850° F.

The preheated heavy oil charge is introduced in a liquid or partially vaporized state into the reactor 10 where it is distributed onto a continuously moving mass of solids generally indicated at 19 which are preferably of a porous nature, and for best operations, ⅛ inch to 1 inch in size, which have been preheated to a suitable temperature, as for example 1000 to 1500° F.

This reactor is somewhat similar to construction and operation to the reactor shown and described in Patent 2,390,031, of February 5, 1946, of myself and Vernon O. Bowles, in that it is important that there be a predetermined spread density, which is accomplished by controlling the oil flow to the several distributing orifices generally indicated at 20 near the top of the reactor 10. The portion of the liquid that is not immediately evaporated should not exceed the pore volume of the discrete bed particles so that a dry coke is formed.

The unvaporized portions of the charge oil are carried down through the reactor 10 in the pores of the solid products and are thus subjected to long-time cracking with the progressive evolution of oil vapors until dryness is reached and only residual coke remains on the solid particles. These solids leave the reactor preferably through the throat 22 and carry the oil coke formed thereon which has been cooled down, by the reactions in the coking zone, to a moderate temperature, as for example 900 to 1100° F.

The vapors rising from the coke zone in the central portion of the reactor 10 and below the feed points 20 join with the vapors immediately flashed off from the feed contact zone adjacent the feed orifices 20 and pass through the upper bed generally indicated at 23 and are severely cracked in the vapor phase under the short time, high temperature conditions thereby providing a maximum conversion of the heavy oil to gases lighter than $C_3$'s. These vapors are drawn off through the discharge line 24, quenched by the tar line 26, and are fed into the tar soot trap 28, from which tar and high boiling aromatic distillates are removed through line 29. A part of this liquid is recycled through the line 30 and heat exchanger 31 to become the tar quench of line 26.

The resulting dry gas, at for example 1150° F., is then withdrawn through line 33 and is passed through the waste heat boiler 34 and reduced in temperature to approximately 700° F., with the resulting production of steam discharged in line 36. The partially cooled gas in line 37 may be introduced to the tower 16 for partial heating of the charge oil previously introduced. A desirable component of oil-gas is withdrawn in line 39.

The tower 16 is provided with an upper scrubber portion 16a having a liquid recycle pump 40 and heat exchanger 41, so that the liquid may be continuously recycled from the trap trays 16b and reintroduced as reflux to the top of the tower through line 42. An aromatic distillate may be removed at 43 as a part of the desired end product.

With further reference to the oil-gas reactor 10, the solids which are removed through the throat 22 are carried into a suitable elevator generally indicated at 50 and carried to the hopper 51 of the gas producer generally indicated at 52. The gas producer 52 is mounted above the oil-gas reactor 10 for a reason that will hereinafter be explained. A star valve 53 or seal leg may be used to maintain the desired rate of introduction of solids and maintain a substantially gastight operation.

In the producer gas reactor 52, the oil carbon carried by the solids is converted into producer gas by passing air and steam through it. The air is introduced through blower 55, and is heated by an air line burner 56 to supply certain necessary process heat. Steam is introduced from the line 58 and the controlled quantity and temperature of air and steam are distributed to the solids bed through line 59 into tuyère 60 which is located near the lower portion of the gas producer 52.

The temperature of the solids leaving the gas producer 52 is controlled by the temperature of the air leaving the air line burner and is maintained at the proper level for optimum operation of the oil reactor 10 below. As this material is at a substantially higher temperature than the material leaving the reactor 10, it is thus preferable to have the hotter material pass by gravity through the star valve 53 while the cooler material is being conveyed by the elevator 50.

The producer gas, which is removed through line 62, passes through waste heat boiler 64 with the production of by-product steam removed in line 65, and is further cooled in the heat exchanger 66 and introduced into the water scrubber 68. This is of a typical type, having the water recycled by pump 69 through heat exchanger 70 and continuously discharged in shower trays at the top of the scrubber by the reintroduction of the water through line 71. The gas product is removed from the system through line 72. From time to time, water may be drawn off at 73 and make up water added at 73a to maintain its purity.

The feed water for the respective steam generator and waste heat boilers 64 may be preheated in any desired manner, as for example, by lagging for the gas producer as indicated at 74. Some of the hot water in the boiler 64 may be withdrawn at 75, and recirculated through the chamber 74 and thence back through line 76 to the steam drum 77 above the waste heat boiler 64. Feed water may be introduced through line 78.

The heating value of the final gas removed at the line 72 is controlled by varying the amount of carbon added to the solids bed in reactor 10 and burned off in gas producer 52. With variations in the type of charge oil, it may be necessary to remove some coke at 81 if too much is formed or, if insufficient coke is produced, more may be added at 82 to the hopper 51.

It may also be found desirable to by pass the gas producer 52 with some of the solids passing through line 83. As will be understood, the objective in gas producer 52 is to burn off the desired amount of carbon and maintain the desired bed temperature. This can be accomplished by passing more or less material of the lower temperature through the bypass line under control of valve 84. The hotter material leaving the bottom of producer 52 can then bring the balance of the solids bed in line 83 up to temperature for the reactor 10.

A further control of operations is to recycle some tar to reactor 10 by the line 85. This tar will lay down a large amount of carbon for a relatively small oil-gas product, and thus an increase in the tar will give an increased total gas make (more producer gas, slightly more oil-gas) and the total gas will have a lower heating value. A decrease in tar recycle will have the opposite effect. It is desired to produce a gas having a heating value of 500 to 600 B. t. u.'s per standard cubic foot, as the preferred type of commercial heating gas.

It will be apparent that the foregoing method and apparatus are not dependent upon catalysts for it is only essential to have a continuous bed of solids for the transfer of the carbon and the maintenance of appropriate heat conditions. The solids most suitable for use in the process would be ones having a very high fusion point, such as coke, alundum, or carborundum. It is also to be noted that moderate temperatures are effective in that the oil-gas reaction is carried out at temperatures around 1200° F. and the maximum temperature in the entire apparatus is in the gas producer which operates most effectively at approximately 2200° F. Even this temperature is quickly lowered by control of air and steam introduction, and the solids bed will pass through the control valve 80 into the oil-gas reactor at the desired temperature of only 1200° F. The temperature is then continuously and further reduced to as low as 900° F. as the temperature of the solids through the elevator to the producer gas reactor 52 above.

I do not wish to limit myself to the absence of catalysts for under some circumstances there may be some advantage in using water-gas sensitive catalysts. In such case, the temperature of reaction can be materially reduced (as for example 1200° F.), and under proper controls, some water gas of low specific gravity can be produced. So far, however, the cost of such catalyst operation appears to outweigh its value.

Steam for seals may be provided at desired points, as for example, at the throat 22 through line 49 and at other places, such as at the throat 54 through line 58a, and wherever else found desirable. The use of excess amounts of steam at 22 and 54 may be found desirable to increase flow of volatile material.

The thermal and material balances in the foregoing process are important from the standpoint of economy. As an example of operation, a typical Bunker "C" oil charge of 1790 bbls. per day will produce 2000 lbs. per hour of an aromatic distillate at 43,000 lbs. per hour of tar at 29, over 11,000 lbs. per hour net of steam at 150 lbs. gage, and 676,000 standard cubic feet per hour of gas at 580 B. t. u. per standard cubic foot. The only additional material required besides the charge oil is approximately 4200 standard cubic feet per minute of air and the fuel necessary for the air line burner 56, and the fired preheater 18, steam for sealing, and accessories. A continuous cycle operation of 100 tons per hour of coke or similar solids bed is contemplated with a production of oil coke which may vary from 1 to 6 tons per hour, with 2 to 3 as preferable. This compares extremely favorably with utilities for other processes.

Figure 2:
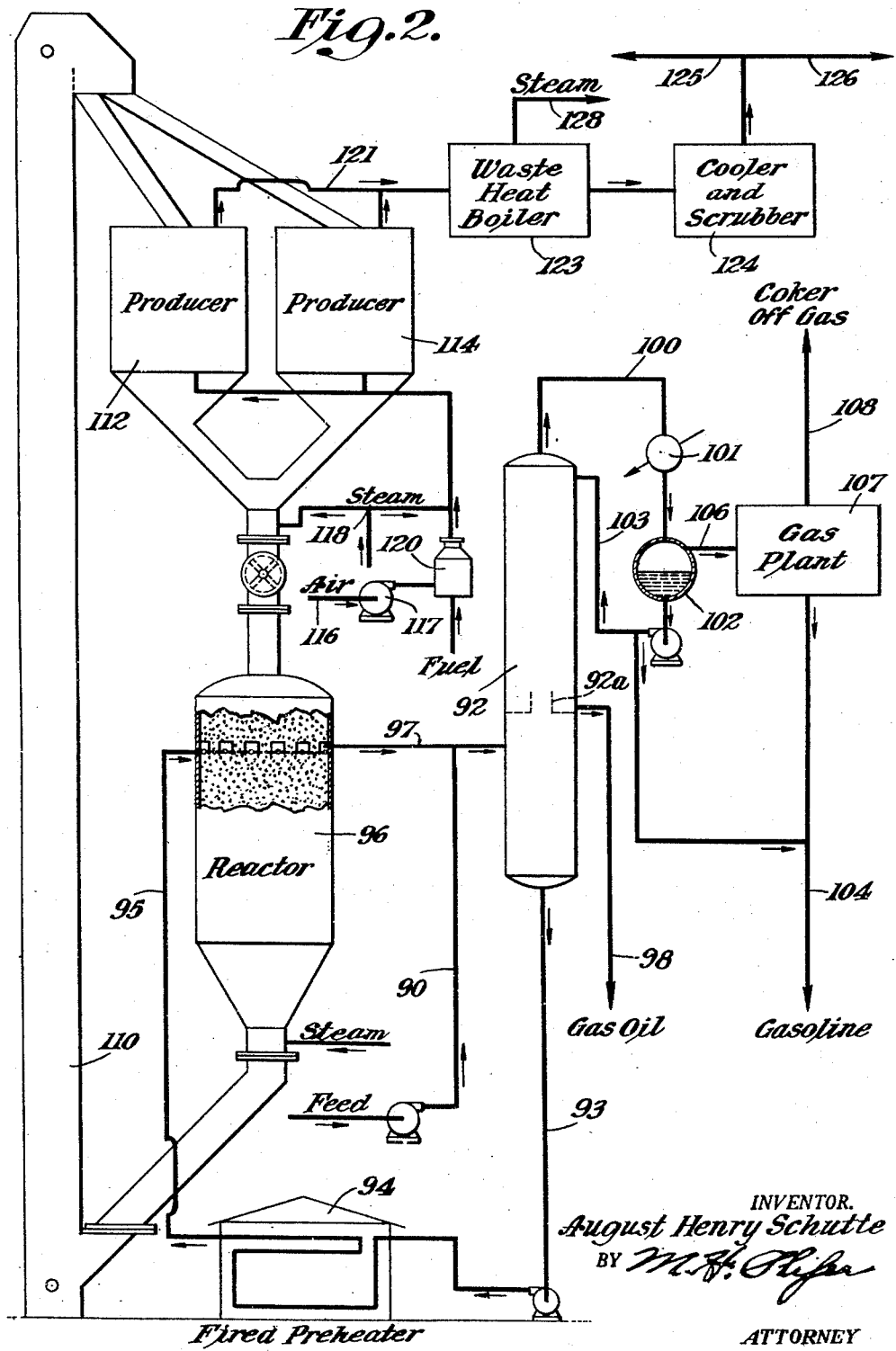
Fig. 2 is a diagrammatic view of a modified form of apparatus more particularly adapted to produce heating gas in connection with a continuous coking operation.

A slightly modified form of construction is shown in Fig. 2, in which the process is adapted to manufacture gas as a by-product of an oil refinery coking operation, where the major product is coker gas oil for further processing. As in the preceding apparatus, the charge oil at 90 is introduced into the tower 92 with a portion of the vapors flashed off and the heavy residual oil withdrawn through the line 93 and passed through the preheater 94 for introduction through the line 95 into the oil-gas reactor 96.

As distinguished from the preceding case, there is no top solids bed and no vapor phase cracking and, therefore, a minimum production of fixed gases. These are withdrawn from the space above the distributor orifices by line 97 and then introduced into the tower 92, preferably with the charge oil, to obtain a desirable cooling of the gas and partial heating of the oil.

A gas-oil may be removed through the line 98 from the trap portion intermediate the ends of the tower 92 and in a similar manner a recycle and reflux may be accomplished by withdrawing the vapors from the top of the tower 92 through line 100 and cooling in the heat exchanger 101 with the liquid portion trapped in a collector 102 and refluxed through line 103. A portion of the condensed reflux is removed through line 104 and under desired operating conditions this will be gasoline. The gas is withdrawn at 106 into the gas plant 107, with a product drawn off at 108, such material being a coker off gas containing $C_3$ fractions, and lighter.

As in the prior case, the solids are removed from the bottom of the oil-gas reactor 96 into an elevator diagrammatically indicated at 110 with a part of the discharge from the elevator going into separate gas producers 112 and 114. Air will be introduced to these gas producers from the line 116 and blower 117, and steam will be introduced from line 118. An air heater 120 will heat the air to the desired temperature for the process heat required.

The producer gas removed from line 121 is preferably passed through waste heat boiler 123, and then cooled and scrubbed at 124. The gas may be used for preheater firing in line 125 or as excess producer gas in line 126. The steam from waste heat boiler is removed at 128. If desired, the coker off gas at 108 may be mixed with the excess producer gas at 126 if a predetermined heating value material is required.

It will thus be apparent that I have described a continuous gas making apparatus and method which is not only readily controlled for the most effective operations, but is materially cheaper and far simpler than equivalent apparatus heretofore available. It is also more economical in that all of the carbon consumed in the unit is turned into product gas. There is no flue gas as waste product and there is no indirect heat exchange. The highly effective heat balance is accomplished within the reaction chamber in that the exothermic heat of reaction resulting from the gasification of the carbon furnishes the endothermic heat for the conversion of the steam to the water gas, and the resulting product thus contains all of the carbon and at a relatively low temperature than was formerly possible in a producer gas unit. There is also the advantage of the lower temperature operation due to the bypassing of the relatively cool solids not required in the producer which blend with the relatively hot producer solids for the desired temperature of operation in the oil-gas reactor. These solids, however, are further reduced in temperature in their passage through the oil-gas reactor with a relatively low temperature in the elevator.

It is to be understood that although the desired arrangement of the apparatus is to superimpose the producer on the oil-gas reactor, whereby there is a gravity flow of the relatively hot solids from the producer, it is possible to mount the producer and oil-gas reactor at substantially similar levels, but this would require an extra elevator.

While I have shown and described preferred forms of embodiment of my invention, I am aware that other modifications may be made thereto which I desire to include within the scope and spirit of my invention.

I claim:

1. A continuous process of reducing heavy liquid hydrocarbons to predominant yields of heating gas of commercial quality in the presence of a freely-flowing, continuous, gravity-packed column of preheated solid particles of coke contact material uniformly moving downwardly solely by gravity, which comprises introducing the contact material at elevated temperatures to the under part of a continuous gravity-packed column in a first sealed vertical reactor, introducing a heavy hydrocarbon charge, a major portion of which is in the liquid state at an intermediate part of said continuous column and below the surface thereof, passing the evolved hydrocarbon vapors upwardly through the upper part of the continuous column in said first reactor to convert a substantial proportion of said vapors to oil-gases having less than three carbon atoms per molecule, maintaining the downwardly moving column in the first reactor below the point of introduction of said heavy hydrocarbon charge and in the presence of steam for sufficient time and at a temperature to form dry coke on the particles, removing the coked particles from a lower part of the first reactor, passing said coked particles through a second sealed reactor, maintaining in said second reactor a downwardly moving, freely-flowing, gravity-packed continuous column of said particles, subjecting said coked particles in said second reactor to an atmosphere of air and steam at a temperature of approximately 2200° F. to generate producer-gas and to reheat the particles, passing said reheated particles to said first reactor, and separately removing said vaporous oil-gas and said producer-gas, each from the upper part of its respective reactor.

2. The combination as defined in claim 1 including the steps of separating tar and high boiling constituents from said vaporous oil-gas and returning at least a portion of said tar and high boiling constituents to the first reactor to regulate the amount of oil-gas produced therein and the amount of producer-gas generated in the second reactor.

3. The method of continuously manufacturing a commercial heating gas of controlled heat value containing producer-gas of lower heat value and oil-gas of higher heat value which comprises passing, a freely-flowing, continuous, gravity-packed column of preheated solid particles of coke contact material uniformly downwardly solely by gravity through a sealed vertical oil-gas stage and through a sealed vertical producer-gas stage, introducing said contact material at elevated temperatures to the upper part of said continuous gravity-packed column in the sealed vertical oil-gas stage, applying a heavy hydrocarbon charge, a major portion of which is in the liquid state, to an intermediate part of said continuous column and below the surface thereof in said oil-gas stage, maintaining said oil-gas stage at a temperature between about 900° F. and about 1500° F., passing the evolved hydrocarbon vapors upwardly through the column above the point of application of said hydrocarbon charge to convert a substantial proportion of said vapors to oil-gases having less than three carbon atoms per molecule, maintaining the downwardly moving column in the oil-gas stage below the point of application of said hydrocarbon charge and in the presence of steam for sufficient time to form dry coke on the particles, removing the coked particles from a lower part of the oil-gas stage, passing said coked particles through said producer-gas stage, maintaining therein a freely-flowing, gravity-packed, continuous column of said particles, subjecting said coked particles to an atmosphere of air and steam at a temperature of approximately 2200° F. to generate producer-gas and to reheat the particles, passing the reheated particles to said oil-gas stage, separately withdrawing said oil-gas and said producer-gas each from the upper part of its respective stage, and mixing at least a portion of said oil-gas with at least a portion of said producer-gas thereby forming a commercial heating gas of desired heating value.

AUGUST HENRY SCHUTTE.

REFERENCES CITED

The following references are of record in the file of this patent:

UNITED STATES PATENTS

| Number | Name | Date |
|---|---|---|
| 2,348,699 | Tuttle | May 9, 1944 |
| 2,374,151 | Wolk | Apr. 17, 1945 |
| 2,378,342 | Voorhees et al. | June 12, 1945 |
| 2,378,607 | Watts | June 19, 1945 |
| 2,395,106 | Day | Feb. 19, 1946 |
| 2,405,395 | Bahlke et al. | Aug. 6, 1946 |
| 2,410,309 | Simpson et al. | Oct. 29, 1946 |
| 2,419,508 | Simpson et al. | Apr. 22, 1947 |
| 2,441,170 | Rose et al. | May 11, 1948 |
| 2,445,328 | Keith | July 20, 1948 |
| 2,527,575 | Roetheli | Oct. 31, 1950 |

FOREIGN PATENTS

| Number | Country | Date |
|---|---|---|
| 419,444 | Great Britain | Nov. 8, 1934 |

OTHER REFERENCES

"The Oil and Gas Journal," May 12, 1945, pages 88–90.